United States Patent [19]

Lin

[11] Patent Number: 5,390,809

[45] Date of Patent: Feb. 21, 1995

[54] VACUUM CONTAINER

[76] Inventor: Shui C. Lin, P.O. Box 82-144, Taipei, Taiwan, Prov. of China

[21] Appl. No.: 138,992

[22] Filed: Oct. 21, 1993

[51] Int. Cl.⁶ .............................................. B65B 31/04
[52] U.S. Cl. .................... 220/212; 220/231; 220/367; 220/420; 220/425; 215/228; 215/270; 215/311; 141/65; 137/522; 137/854; 417/553
[58] Field of Search ............... 220/212, 231, 367, 420, 220/425; 215/228, 270, 307, 309, 311; 141/25, 26, 27, 28, 65; 137/522, 854; 417/553

[56] References Cited

U.S. PATENT DOCUMENTS

| | | | |
|---|---|---|---|
| 3,454,182 | 7/1969 | Morton | 137/854 X |
| 4,249,583 | 2/1981 | Lundbladh | 141/65 |
| 4,278,114 | 7/1981 | Ruberg | 141/65 |
| 4,401,224 | 8/1983 | Alonso | 137/854 X |
| 4,865,014 | 9/1989 | Nelson | 126/361 |
| 4,975,028 | 12/1990 | Schultz | 417/442 |

Primary Examiner—Allan N. Shoap
Assistant Examiner—Nova Stucker
Attorney, Agent, or Firm—Alfred Lei

[57] ABSTRACT

This invention relates to a vacuum container and in particular to one including an inner container, an outer container receiving said inner container, a lid provided with a packing formed with an outer annular groove for receiving an upper rim of said outer container and an inner annular groove for receiving an upper rim of said inner container, a check valve mounted on a central portion of said lid, a control valve composed of two one-way valves, and a vacuum extractor including a sleeve and a seat engaged with the lower end of said sleeve, said sleeve being a tubular member in which is inserted a piston, said piston having a lower end formed with an upper flange and a lower flange between which is fitted a leak-proof gasket, said upper flange being formed with a pair of exhaust openings.

1 Claim, 5 Drawing Sheets

VACUUM CONTAINER

BACKGROUND OF THE INVENTION

It has been found that the prior art vacuum container sold in the marketplace can be only used to preserve food but cannot be used to keep the temperature thereof. Further, the temperature of the food stored in such a vacuum container will be conducted to its outer surface hence often causing the user to be burnt or frozen.

Therefore, it is an object of the present invention to provide an improved vacuum container which may obviate and mitigate the above-mentioned drawbacks.

SUMMARY OF THE INVENTION

This invention relates to an improved vacuum container.

It is the primary object of the present invention to provide a vacuum container which utilizes an isolated inner container for receiving food.

It is another object of the present invention to provide a vacuum container which has an air extractor for drawing air thereof.

It is still another object of the present invention to provide a vacuum container which may keep the food in the inner container at a almost constant temperature.

It is still another object of the present invention to provide a vacuum container which is simple in construction.

It is a further object of the present invention to provide a vacuum container which is fit for practical use.

Other objects and merits and a fuller understanding of the present invention will be obtained by those having ordinary skill in the art when the following detailed description of the preferred embodiment is read in conjunction with the accompanying drawings wherein like numerals refer to like or similar parts.

BRIEF DESCRIPTION OF THE DRAWINGS

FIGS. 3, 3A 3B, 4, 4A and 4B show the working principle of the present invention.

DETAILED DESCRIPTION OF THE PREFERRED EMBODIMENT

Figure 1:
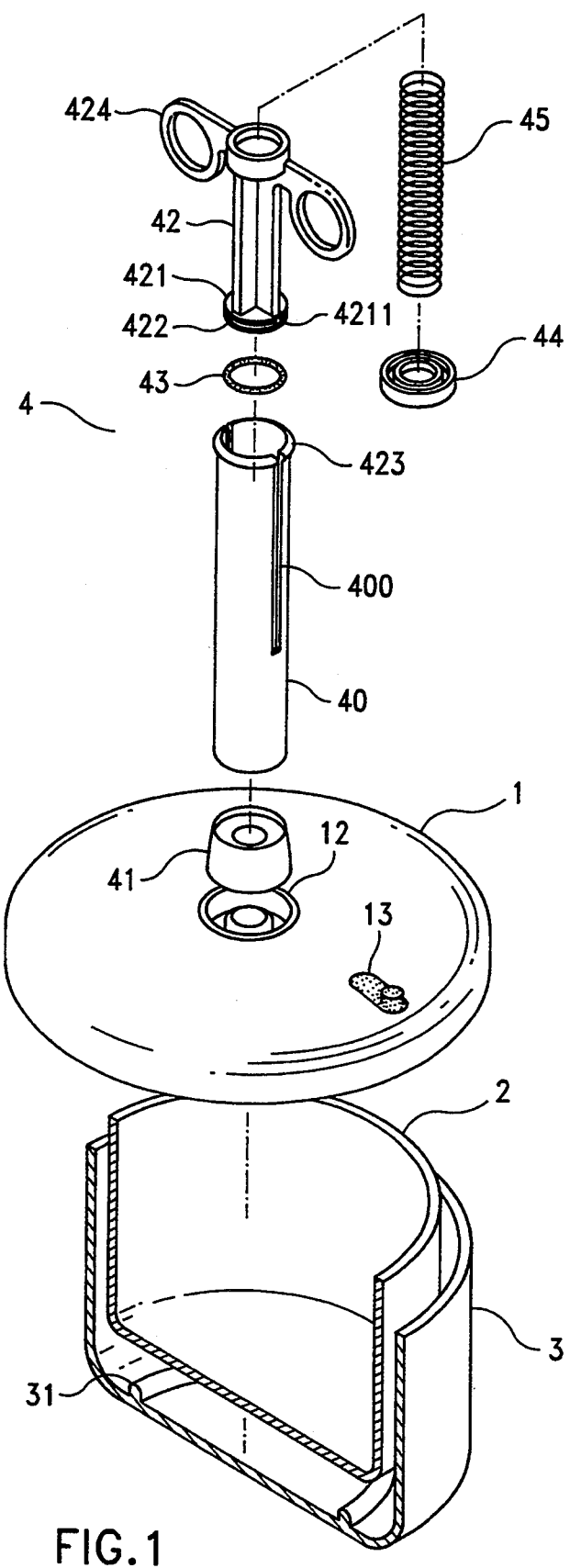
FIG. 1 is an exploded view of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the vacuum container according to the present invention mainly comprises a lid 1, an inner container 2, an outer container 3, and a vacuum extractor 4.

Figure 2:
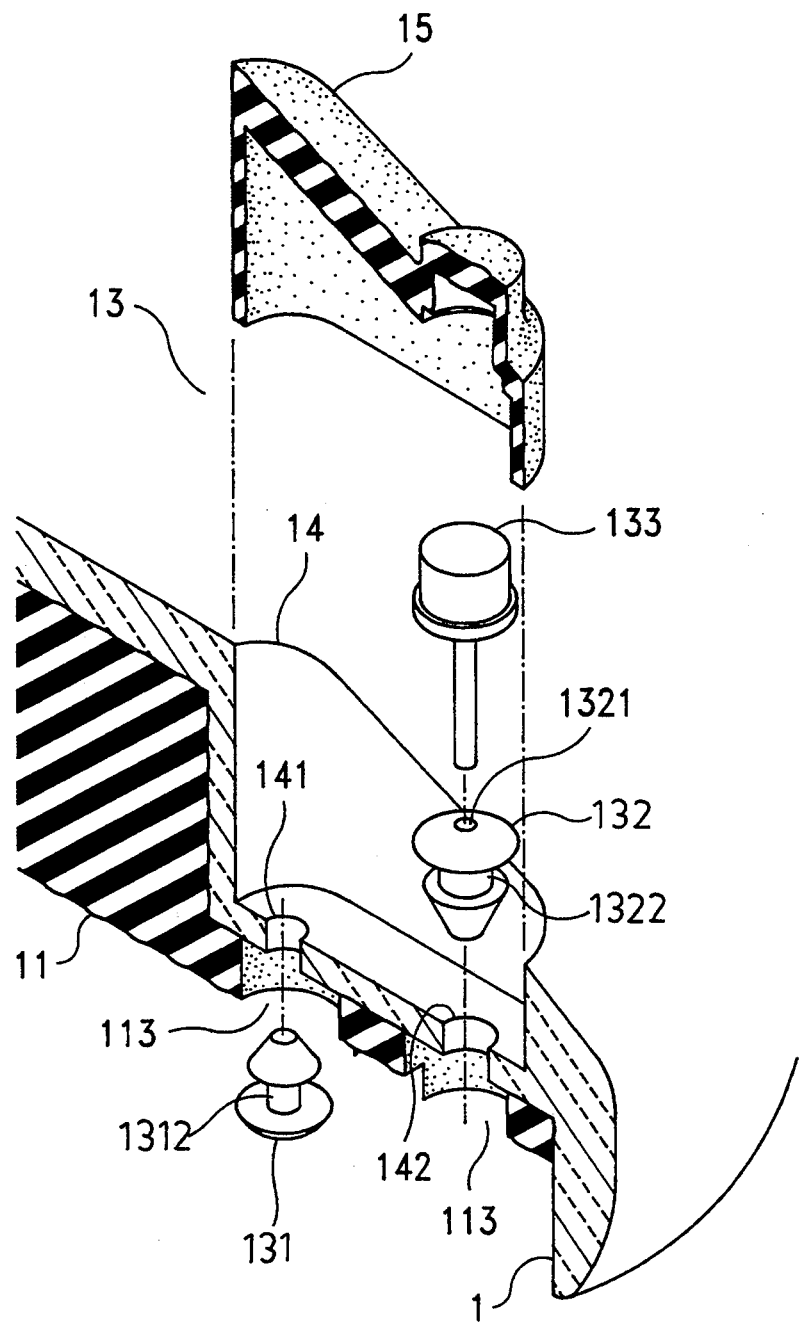
FIG. 2 is an exploded view of the valve.
Figure 5A:
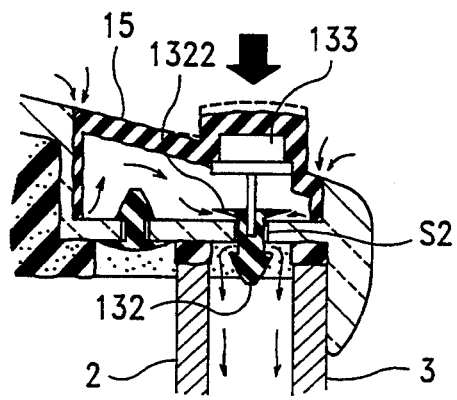
FIG. 5A is an enlarged fragmentary view of FIG. 5.
Figure 5:
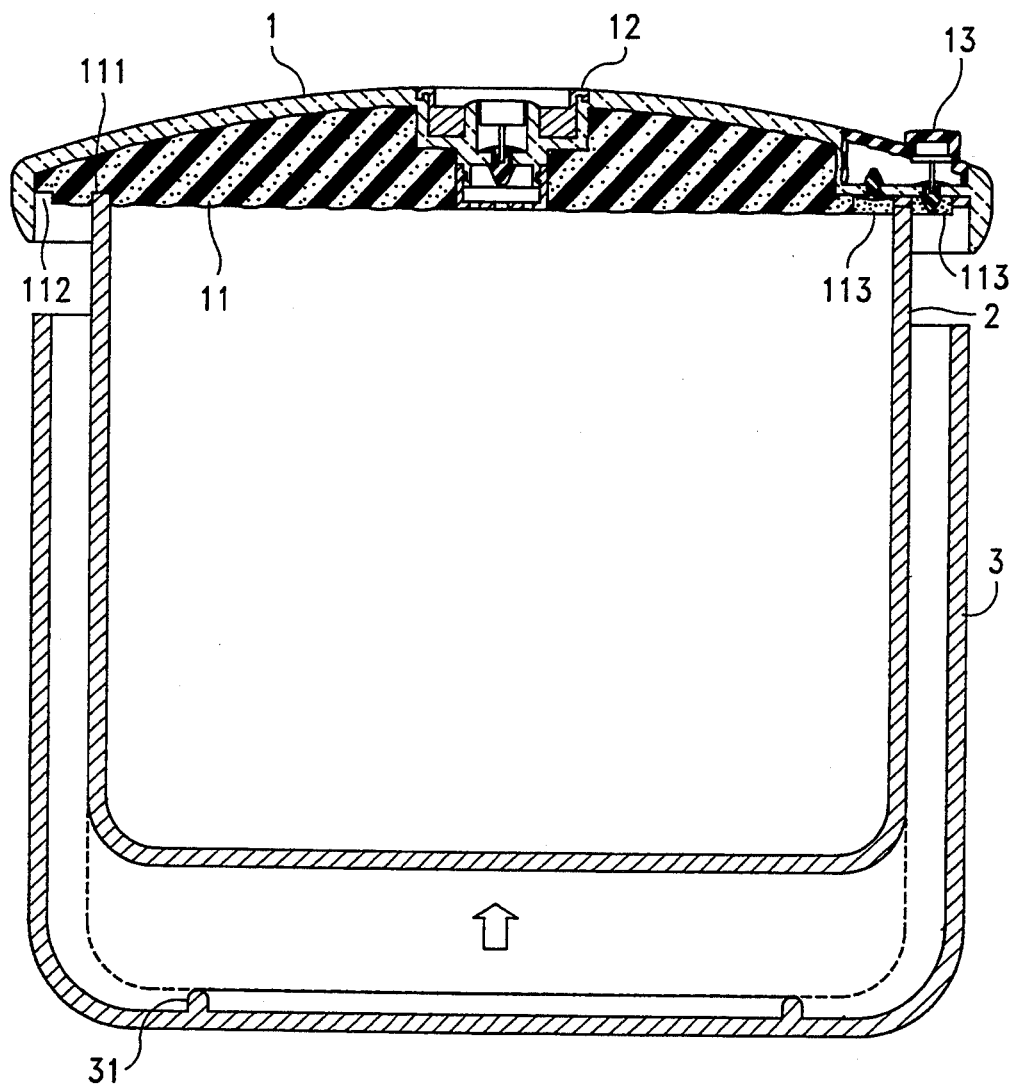
FIG. 5 shows the way to separate the inner container from the outer container.

The bottom of the lid 1 is provided with a packing 11 (see FIGS. 2 and 5) which is formed with an outer annular groove 112 for receiving the upper rim of the outer container 3 and an inner annular groove 111 for receiving the upper rim of the inner container 2. On the center of the lid 1 there is mounted a check valve 12 for extracting air out of the inner container 2 and the outer container 3. The check valve 12 is well known in the art and has no need to be described here in detail. In addition, the check valve 12 may be of any design well known to those skilled in the art and is not considered as a part of the invention. Further the lid 1 is provided with a control valve 13 above the upper rims of the inner container 2 and the outer container 3. As shown in FIG. 2, the lid 1 is formed with a recess 14 the bottom of which has two openings 141 and 142. The packing 11 is formed with two holes 113 each aligned with one of the openings 141 and 142. Further, the opening 142 is located between the inner container 2 and the outer container 3. One-way valves 131 and 132 are engaged with the openings 141 and 142 so that the neck 1312 of the one-way valve 131 and the neck 1322 of the one-way valve 132 are disposed within the openings 141 and 142, respectively. The neck 1312 of the one-way valve 131 and the neck 1322 of the one-way valve 132 are slightly smaller the openings 141 and 142, respectively. However, the clearance between the neck 1312 and the opening 141 and the clearance between the neck 1322 and the opening 142 are very small and are not shown in the drawings. A gas relief button 133 is inserted in the blind hole 1321 of the one-way 132. A flexible cap 15 is fitted in the recess 14 of the lid 1.

The inside bottom of the outer container 3 is formed with a raised annular member 31 for supporting the inner container 2.

The vacuum extractor 4 includes a sleeve 40 and a seat 41 engaged with the lower end of the sleeve 40. The sleeve 40 is a tubular member in which is inserted a piston 42. The upper end of the piston 42 is provided with a pair of ears 424 which protrude out the slots 400 of the sleeve 40 and may slide therealong. The lower end of the piston 42 is formed with an upper flange 421 and a lower flange 422 between which there is a circular neck portion 500 on which is fitted a leak-proof gasket (see FIG. 3B). The leaf-proof gasket 43 is a ring-like member which has an inner diameter which is slightly larger than the outer diameter of the circular neck portion 500 of the piston 42. The clearance between the leaf-proof gasket 43 and the circular neck portion 500 of the piston 42 is very small and is not shown in the drawing, is fitted a leak-proof gasket 43. The upper flange 421 is formed with a pair of exhaust openings 4211. A spring 45 is fitted into the piston 42 and a cover 44 is mounted on the top of the piston 42 thereby keeping the spring 45 in the piston 42.

Figure 3:
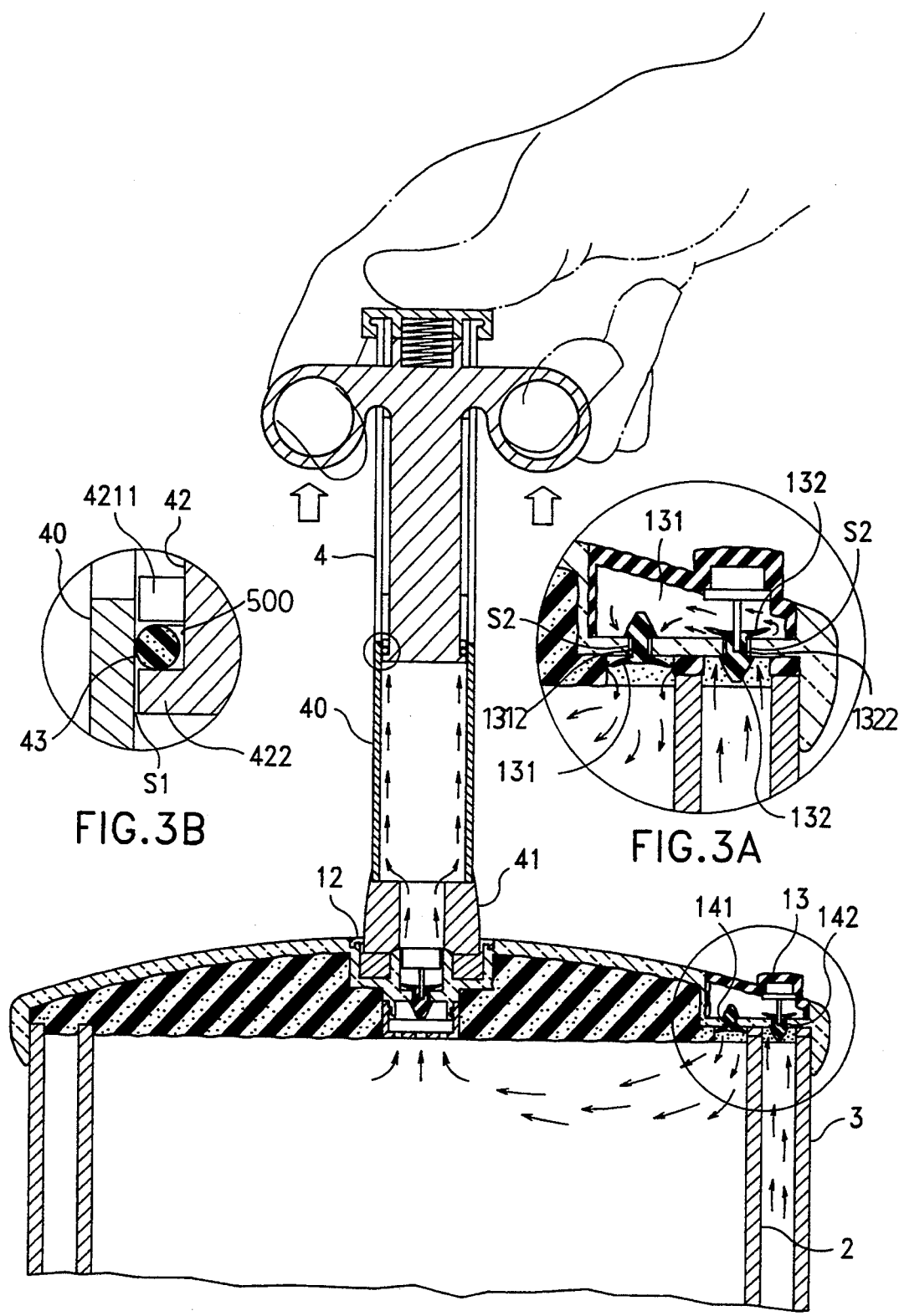
Figures 4A, 4B:
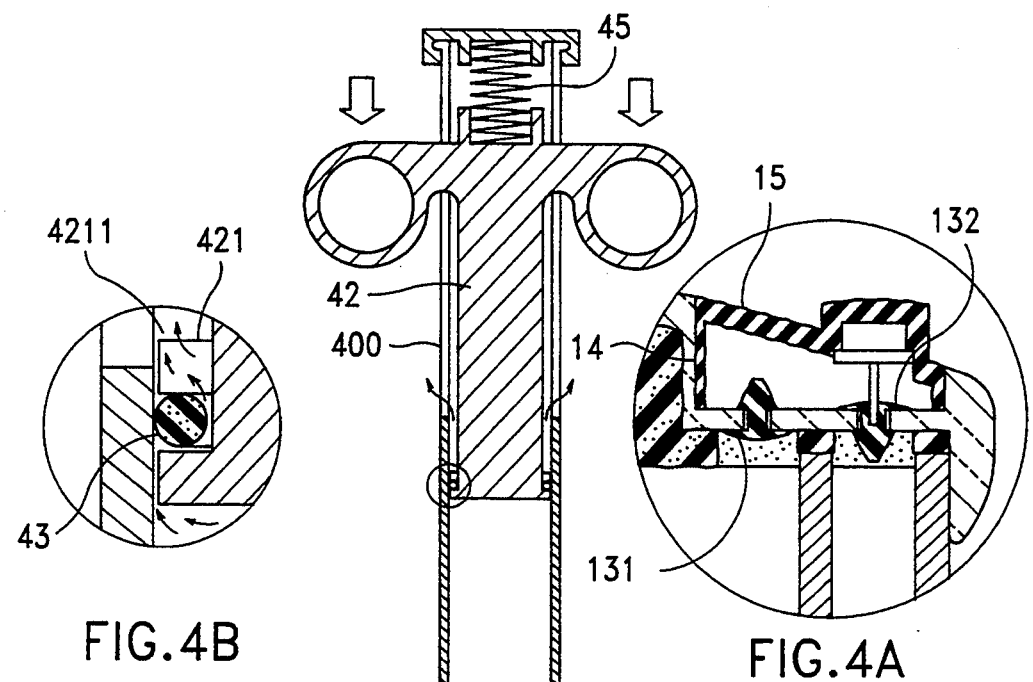
Figure 4:
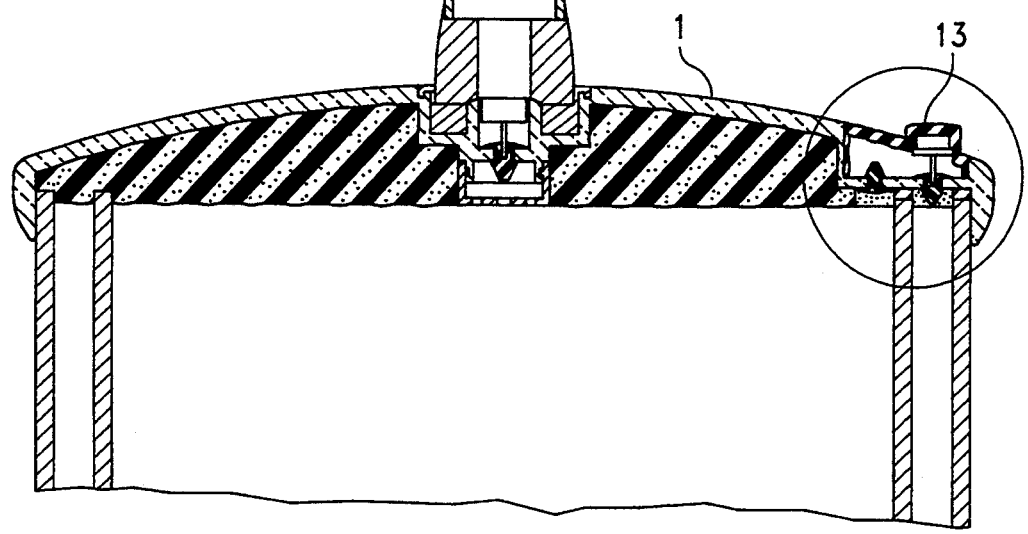

When the piston 42 is pulled upward, the leak-proof gasket 43 will be forced to seal the clearance S1 between the piston 42 and the sleeve 40 (see FIGS. 3, 3A and 3B). Then, the one-way valves 131 and 132 of the control valve 13 will be attracted open thereby drawing air out of the inner container 2 and the outer container 3 into the sleeve 40. Thereafter, press the piston 42 downward so that the leak-proof gasket 43 will be lifted to engage the bottom of the upper flange 421 thereby enabling the air to flow into the space between the upper flange 421 and the lower flange 422 of the piston 42 and therefore causing the air to be exhausted out of the exhaust openings 4211. (see FIGS. 4, 4A and 4B)

As the air is drawn out of the inner container 2 and the outer container 3, the lid 1 will be close 17 engaged with the inner container 2 and the outer container 3 by the atmospheric pressure. Hence, the inner container 2 will be isolated from the outside thus almost keeping the inner container at a constant temperature.

When desired to take the inner container 2 out of the outer container 3, simply press the gas relief button 133 to lower the one-way valve 132 thereby opening the hole 142 so that the flexible cap 15 is deformed thereby letting air go into the space between the inner container 2 and the outer container 3. Then, the lid 1 together with the inner container 2 can now be removed from the outer container 3 (see FIGS. 5 and 5A).

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:
1. A vacuum container comprising:
   an inner container;
   an outer container receiving said inner container;
   a lid provided with a packing formed with an outer annular groove for receiving an upper rim of said outer container and an inner annular groove for receiving an upper rim of said inner container, said lid being formed with a recess having a first opening in communication with a space between said inner container and said outer container, said packing having a first hole aligned with said first opening and a second hole aligned with said second opening;
   a flexible cap fitted in the recess of said lid;
   a check valve mounted on a central portion of said lid;
   a first one-way valve fitted in said first opening;
   a second one-way valve fitted in said second opening;
   a gas relief button disposed within the recess of said lid and connected with a top of said first one-way valve; and
   a vacuum extractor arranged on said check valve, said vacuum extractor including a sleeve and a seat engaged with a lower end of said sleeve, said sleeve being a tubular member in which is inserted a piston, said piston having a lower end formed with an upper flange and a lower flange between which there is a circular portion on which is fitted a leak-proof gasket, said upper flange being formed with a pair of exhaust openings, said leak-proof gasket being a ring-like member which is slightly larger than an outer diameter of said circular portion.

* * * * *